Patented Apr. 10, 1928.

1,665,234

UNITED STATES PATENT OFFICE.

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY.

PROCESS FOR MAKING FURFURAL RESINS.

No Drawing. Application filed May 26, 1924, Serial No. 715,816. Renewed February 27, 1928.

This invention pertains to methods or processes for making resinous materials from furane derivatives and more particularly relates to processes for making furfural resins.

It is the purpose of this invention to provide a rapid, inexpensive and efficient process for making resinous materials from furane derivatives. More specifically, one of the objects of this invention is to provide an efficient catalyst for causing rapid resinification of furane derivatives and particularly furfural.

A further object of this invention is to provide a catalyst for this purpose which may be readily removed from the material after the reaction has progressed to the desired extent. Catalysts which are fluid or in the form of solutions are often difficult to use in practice particularly if it is desired to check the reaction at a partially completed stage.

Under properly controlled conditions certain reactions will take place in furane derivatives, such as furfural, resulting in the formation of resinous materials. We have discovered that such reactions may be made to take place by at least three different methods. First, furfural by itself may be continuously heated for a long period of time and after several months the reaction will be manifested by the formation of small amounts of soft resinous material. Second, furfural may be allowed to stand without heating for a year or more in the presence of a suitable catalyst and the reaction will also manifest itself by a slight resinification. Third, a furane derivative, such as furfural, may be heated in the presence of a catalyst and resinification will take place much more quickly than with the independent use of either heat or a catalyst.

We have discovered that under properly controlled conditions various metals comprise very efficient catalysts for use in the resinification of furane derivatives, such as furfural. Among the metals found to be effective as catalysts are iron, nickel, lead, magnesium, zinc and tin. These metals may be preferably added to the furfural in the form of finely divided particles, or in the form of a precipitate of the metal on a porous inert material, although if the furfural is constantly agitated satisfactory catalytic effects are obtainable by merely placing the furfural in a container made of one of the above mentioned metals. While several metals have been enumerated above which serve effectively as catalysts for the reaction in producing a furfural resin from furfural, it is conceivable that many other metals will act in a similar manner and, therefore, the term "metal catalyst for the reaction" and the term "metal that serves as a catalyst for the reaction" refer to those metals only which act in the nature of catalytic agents in producing a furfural resin from furfural.

The rate at which the reaction takes place may be controlled either by the form of catalyst used or by regulation of the temperature. Thus if furfural is continuously heated at a temperature of 100–110° C. in the presence of iron, nickel or lead for several days, resinification is manifested by the formation of a thick jelly. However, in order to secure a more rapid rate of reaction for commercial purposes, the use of higher temperatures and pressures above atmospheric pressure are desirable. For example, resinification results when furfural is heated under pressure for several hours at temperatures between 163–170° C. in the presence of one of the above mentioned metallic catalysts. As the reaction proceeds a soft viscous resin first forms which later changes to a semi-solid stage. The resin in this form is fusible and is soluble in acetone and the like, but insoluble in water. If the reaction is allowed to proceed to a conclusion, the fusible, soluble product is transformed into an insoluble, infusible solid.

In any case, the character of the product may be easily controlled by merely removing the resinous material from contact with the metallic catalyst. For example, if the catalyst is in the form of a metal container, it is merely necessary to remove the resinous body from the container or if the catalyst is in the form of small particles, the resin may be separated therefrom by any suitable known mechanical process.

By thus properly controlling the speed and extent of the reaction as above described, we are able to secure a product of various degrees of consistency depending upon the stage at which the reaction is stopped. Furthermore, the resulting product formed by stopping the reaction at any particular intermediate stage may be substantially permanently retained at its existing consistency by the removal of the catalyst.

Since the reaction is readily controlled in accordance with our invention and may be arrested at any stage in the resinification of the furane derivative, the resulting resins are adaptable to the various well known uses of the natural and synthetic resins.

Throughout this application we have employed the term "furane derivative". It is to be understood, however, that by this term is meant a chemical compound containing no other ring nucleus but the furane ring, as distinguished from a furane compound which is a chemical compound containing another ring nucleus or other ring nuclei besides the furane ring.

It will be understood that various changes and substitutions of equivalents may be made without departing from the scope and principle of the invention set forth or intended to be set forth in the appended claims.

Having thus described our invention, what we claim as new and desire to secure by Letters Patent of the United States, is:

1. The process of making a furfural resin which comprises heating furfural in the presence of a metal that serves as a catalyst for this reaction.

2. The process of obtaining a resinous substance which comprises treating furfural with a metal that serves as a catalyst for this reaction.

3. The process of obtaining a resinous reaction product which comprises subjecting furfural to the action of a metal that serves as a catalyst for the reaction and to such temperature as to produce a fusible soluble resin.

4. The process of obtaining a furfural resin which comprises submitting furfural with a metal that serves as a catalyst for the reaction to such temperature and pressure as to produce a fusible soluble resin.

5. The process of obtaining a furfural resin which comprises heating furfural under pressure with a metal serving as a catalyst for the reaction to a temperature above the atmospheric boiling point of furfural until a fusible soluble resin is formed.

6. The process of obtaining a furfural resin which comprises heating furfural with a catalyst embodying at least one metal that serves as a catalyst for the reaction to such a temperature and under such pressure that a non-gelatinous resinous reaction product is produced.

In witness whereof, we have hereunto subscribed our names.

CARL S. MINER.
JOHN P. TRICKEY.